(12) United States Patent
Koubaa et al.

(10) Patent No.: US 11,488,488 B2
(45) Date of Patent: Nov. 1, 2022

(54) BLOCKCHAIN-BASED SOLUTION FOR INTERNET OF DRONES SECURITY AND PRIVACY

(71) Applicant: Prince Sultan University, Riyadh (SA)

(72) Inventors: Anis Koubaa, Riyadh (SA); Azza Allouche, Riyadh (SA); Mohamed Khalgui, Riyadh (SA); Omar Cheikhrouhou, Riyadh (SA)

(73) Assignee: Prince Sultan University, Riyadh (SA)

( * ) Notice: Subject to any disclaimer, the term of this patent is extended or adjusted under 35 U.S.C. 154(b) by 363 days.

(21) Appl. No.: 16/733,451

(22) Filed: Jan. 3, 2020

(65) Prior Publication Data

US 2021/0209956 A1 Jul. 8, 2021

(51) Int. Cl.
*G08G 5/00* (2006.01)
*H04L 9/40* (2022.01)
(Continued)

(52) U.S. Cl.
CPC ......... *G08G 5/0095* (2013.01); *B64C 39/024* (2013.01); *G05D 1/0011* (2013.01);
(Continued)

(58) Field of Classification Search
CPC .. G08G 5/0095; G08G 5/0013; G08G 5/0069; G08G 5/0043; B64C 39/024;
(Continued)

(56) References Cited

U.S. PATENT DOCUMENTS

2017/0366416 A1\* 12/2017 Beecham ................ H04L 45/50
2018/0072415 A1    3/2018 Cantrell et al.
(Continued)

FOREIGN PATENT DOCUMENTS

CN     108960831 A    12/2018

OTHER PUBLICATIONS

"A New Secure Data Dissemination Model in Internet of Drones" by S. Aggarwal et al., May 1, 2019 ICC 2019 • 2019 IEEE International Conference on Communications (ICC) (pp. 1-6) (Year: 2019).\*

(Continued)

*Primary Examiner* — Peter D Nolan
*Assistant Examiner* — Tanya C Sienko
(74) *Attorney, Agent, or Firm* — Oblon, McClelland, Maier & Neustadt, L.L.P.

(57) ABSTRACT

A secure system for control of at least one unmanned aerial vehicle (UAV), includes a cloud service and a ground control station. The cloud service includes a cloud-based management service having processing circuitry configured to control communications between the cloud service, the ground control station and the at least one UAV, and control and monitor the at least one UAV by way of a corresponding at least one UAV client device. The UAV client device receives messages from the at least one UAV, sends commands to the at least one UAV, verifies the sender of each of the received messages, creates a new block for each received message and sent commands as new transactions, including performs a consensus algorithm for the new block, determines a consensus to validate the new block, and updates a blockchain with the validated new block.

18 Claims, 13 Drawing Sheets

(51) Int. Cl.
*H04L 67/1097* (2022.01)
*G05D 1/00* (2006.01)
*G06F 16/23* (2019.01)
*B64C 39/02* (2006.01)
*H04L 67/02* (2022.01)

(52) U.S. Cl.
CPC ....... *G06F 16/2379* (2019.01); *G08G 5/0013* (2013.01); *G08G 5/0069* (2013.01); *H04L 63/123* (2013.01); *H04L 67/1097* (2013.01); *H04L 67/02* (2013.01)

(58) Field of Classification Search
CPC ............ B64C 2201/146; G05D 1/0011; G05D 1/0022; G06F 16/2379; H04L 63/123; H04L 67/02; H04L 67/1097; H04L 67/025; H04L 67/125; H04L 63/126; H04L 67/34; H04W 4/40
See application file for complete search history.

(56) References Cited

U.S. PATENT DOCUMENTS

| | | | | |
|---|---|---|---|---|
| 2018/0270244 | A1* | 9/2018 | Kumar | H04L 9/3236 |
| 2019/0180237 | A1* | 6/2019 | Mattingly | H04L 9/50 |
| 2019/0238338 | A1* | 8/2019 | O'Brien | H04L 63/0428 |
| 2019/0266897 | A1* | 8/2019 | Turato | H04L 9/3239 |
| 2019/0306757 | A1* | 10/2019 | Husain | G05D 1/0011 |
| 2020/0019626 | A1* | 1/2020 | Todd | G06F 16/29 |
| 2020/0372808 | A1* | 11/2020 | Carraway | G08G 5/0069 |

OTHER PUBLICATIONS

"A Service-Oriented Cloud-Based Management System for the Internet-of-Drones" by A. Koubaa et al. 2017 IEEE International Conference on Autonomous Robot Systems and Competitions (ICARSC) Apr. 26-28, Coimbra, Portugal (Year: 2017).*

"Blockchain-base structures for a secure and operated network of semi-autonomous Unmanned Aerial Vehicles" by A. Kuzmin et al., International Conference on Service Operations and Logistics, and Informatics (SOLI 2018) pp. 32-37. (Year: 2018).*

X. Liang, J. Zhao, and D. Li "Towards Data Assurance and Resilience in IoT Using Blockchain". Milcom 2017 Track 3—Cyber Security and Trusted Computing. (Year: 2017).*

Sharma, et al. ; Socializing Drones for Inter-Service Operability in Ultra-Dense Wireless Networks using Blockchain ; Oct. 30, 2017 ; 4 Pages.

Llang, et al. ; Towards Data Assurance and Resilience in IoT Using Blockchain ; Oct. 2017 ; 7 Pages.

Aggarwal, et al. ; A New Secure Data Dissemination Model in Internet of Drones ; Apr. 29, 2019 ; 6 Pages.

* cited by examiner

BLOCKCHAIN-BASED SOLUTION FOR INTERNET OF DRONES SECURITY AND PRIVACY

STATEMENT OF ACKNOWLEDGEMENT

The authors would like to acknowledge the support provided by the Robotics and Internet of Things Lab of Prince Sultan University.

BACKGROUND

Technical Field

The present disclosure is directed to use of blockchain technology for securing a network of unmanned aerial vehicles.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Unmanned aerial vehicles (UAVs), commonly known as drones, are a type of aircraft without a human pilot on board. UAVs are a component of an unmanned aircraft system, which typically includes a UAV, a ground-based controller, and a system of communications between the two. The flight of UAVs may operate with various degrees of autonomy, ranging from remote control by a human operator to autonomously by onboard computers. For example, a UAV may be remotely piloted through the ground-based controller. The UAV may send flight control signals including attitude and speed to the controller. In response, the UAV is controlled by remote pilot commands. In a second level of control, a UAV may be provided with a preplanned mission. The mission may involve several UAVs spaced apart by a wide airspace of several miles. In a third level, a UAV may be adjusted with a modifiable mission that may be changed based on health and status of on-board sensors. New plans may be uploaded if the sensors indicate a problem. In a fourth level, a UAV may be configured to respond to real time faults. The UAV may be provided with an ability to compensate for most failures and flight conditions in order to continue to accomplish a mission plan. In a fifth level, a UAV may be adaptive to a failure. Several UAVs are provided with the ability to communicate with each other to accomplish a group plan. Each UAV may compensate for failures through on-board trajectory re-planning. In a sixth level, a group of UAVs may perform real time coordination to accomplish a group plan. Each UAV may be configured to diagnose most failures and flight conditions, and predict the onset of failures. In a seventh level, a group of UAVs may cooperate in real time to accomplish group goals. The UAVs may coordinate trajectory planning according to current and predicted conditions. In this level, UAVs may be separated by just about 100 yards. In an eight level, a group of UAVs may exchange data in a limited range, timeframe, and quantity in order to limit interference. Each UAV may perform individual task planning and execution. The group of UAVs may accomplish goals with minimal supervisory assistance. In a ninth level, a group of UAVs operate with reduced dependency of off-board data. The group performs coordinated group planning, but each UAV individually may perform task planning and execution. In a tenth level, a group of UAVs operate in a complex environment and each UAV depends on on-board tracking. Group planning is distributed and each UAV determines task planning and execution. Each UAV operates with no supervisory assistance. In a highest level, a UAV is configured for fully autonomous operation based on on-board sensors. The UAV may coordinate with other UAV depending on a condition or event. Otherwise, the UAV is capable of total independence.

The use of UAVs are increasingly gaining interest for enabling several applications, such as package delivery, traffic surveillance, search and rescue, smart cities and surveillance. See S. Hayat, E. Yanmaz, and R. Muzaffar, "Survey on unmanned aerial vehicle networks for civil applications: A communications viewpoint." *IEEE Communications Surveys and Tutorials*, vol. 18, no. 4, pp. 2624-2661, 2016, incorporated herein by reference in its entirety.

On-board system hardware for small UAVs typically includes a flight controller, flight controller board, or autopilot. Small UAVs typically operate via remote piloting commands transmitted from the ground control station (first level).

Despite the limited capabilities of these small drones, their low cost has resulted in an emerging trend of integration with the Internet-of-Things and the cloud. In particular, the concept of the Internet of-Drones (IoD) has emerged as a specific case of the IoT where the UAVs represent the things connected through the Internet through abstract interfaces. See M. Gharibi, R. Boutaba, and S. L. Waslander, "Internet of drones," *IEEE Access*, vol. 4, pp. 1148-1162, 2016, incorporated herein by reference in its entirety. IoD has evolved into a way to couple with the Internet of Things as well as with cloud robotics technologies to allow remote access and control between drones and users over the Internet, as well as computation offloading and cloud storage capabilities. See A. Koubâa, B. Qureshi, M.-F. Sriti, Y. Javed, and E. Tovar, "A service-oriented cloud-based management system for the internet-of-drones," in *17th IEEE Int. Conf on Autonomous Robot Systems and Competitions (ICARSC)*, April 2017, pp. 329-335; and B. Qureshi, A. Koubaa, M.-F. Sriti, Y. Javed, and M. Alajlan, "Poster: Dronemap—a cloud-based architecture for the internet-of-drones." in *EWSN,* 2016, pp. 255-256, each incorporated herein by reference in their entirety.

While IoD is a rapidly emerging technology, it introduces various challenges regarding Wireless connectivity, reliable point-to-point communications, and computing infrastructure. See G. Choudhary, V. Sharma, T. Gupta, and I. You, "Internet of drones (iod): Threats, vulnerability, and security perspectives," *arXiv preprint arXiv:* 1808.00203, 2018; A. Koubâa, B. Qureshi, M.-F. Sriti, A. Allouch, Y. Javed, M. Alajlan, O. Cheikhrouhou, M. Khalgui, and E. Tovar, "Dronemap planner: A service-oriented cloud-based management system for the internet-of-drones," *Ad Hoc Networks,* 2018; and M. Rodrigues, D. F. Pigatto, J. V. Fontes, A. S. Pinto, J.-P. Diguet, and K. R. Branco, "Uav integration into ioit: Opportunities and challenges," *ICAS* 2017, p. 95, 2017, each incorporated herein by reference in their entirety.

Security is another important challenge for IoD, and remains the major obstacle to the large scale adoption and deployment of IoD since it is highly vulnerable to cyber attacks for numerous reasons:

UAVs data and commands, which are sent through an untrusted wireless communication channel, are prone to malicious modifications from an attacker. See C. Lin, D. He, N. Kumar, K. R. Choo, A. Vinel, and X. Huang, "Security and privacy for the internet of drones: Challenges and solutions," *IEEE Communications Magazine*, vol. 56, no. 1, pp. 64-69, January 2018, incorporated herein by reference in its entirety.

Low-cost UAVs have limited resources in terms of computation, energy, memory, storage and processing capacity preventing them from implementing advanced security solutions on-board.

Many existing IoD systems rely on centralized architectures to connect drones to servers or cloud computing that supports processing and storage of streams of data originated from UAVs. Attacks on servers and databases will impact the data integrity.

A possible solution to the above challenges is the integration of Blockchain technology and an IoD architecture. Blockchain technology has been used in cryptocurrency applications such as Bitcoin. Blockchain technology can offer viable solutions to IoD security and privacy problems due to its decentralized nature, distributed aspect, and being equipped with an information protection mechanisms. See S. Nakamoto, "Bitcoin: A peer-to-peer electronic cash system," 2008; and M. Ali, J. C. Nelson, R. Shea, and M. J. Freedman, "Blockstack: A global naming and storage system secured by blockchains." in *USENIX Annual Technical Conference*, 2016, pp. 181-194, each incorporated herein by reference in their entirety.

The integration of Blockchain technology and an IoD architecture has the potential for improving IoD by adding enhancements such as decentralized trust management, peer-to-peer communication, enhanced security, immutability and data privacy. However, although there has been an increase in research interest related to the integration of Blockchains into IoT, no research has included Blockchain as a technology for IoD security.

The application of Blockchain to IoT is studied in Christidis et al. See K. Christidis and M. Devetsikiotis, "Blockchains and smart contracts for the internet of things," *IEEE Access*, vol. 4, pp. 2292-2303, 2016, incorporated herein by reference in its entirety. The authors provide a description on how smart contracts of Blockchain can be integrated in IoT. The authors concluded that the Blockchain-IoT combination can facilitate the sharing of IoT services and resources and automate, in a cryptographically verifiable manner, several, time-consuming works. However, the authors did not discuss how this integration can help in enhancing the security of IoT.

Dorri et al. propose a lightweight Blockchain solution for IoT. See A. Dorri, S. S. Kanhere, R. Jurdak, and P. Gauravaram, "Blockchain for iot security and privacy: The case study of a smart home," in 2017 *IEEE International Conference on Pervasive Computing and Communications Workshops (PerCom Workshops)*, March 2017, pp. 618-623; and A. Dorri, S. S. Kanhere, and R. Jurdak, "Blockchain in internet of things: challenges and solutions," *arXiv preprint arXiv: 1608.05187*, 2016, each incorporated herein by reference in their entirety. Their approach relies on a private and local Blockchain to provide secure access control to the IoT devices. However, although this solution may resolve the problem of secure access, their approach has many drawbacks. A private Blockchain has restrictions that are not found in a public Blockchain. Local Blockchains are not distributed but centralized. Thus local blockchains also have restrictions that are not found in a public Blockchain. Contrary to the principle benefit of a Blockchain of a distributed ledger, a local Blockchain limits the power and availability of a Blockchain.

In Xu et al., the authors proposed Saphire, a Blockchain-based distributed storage system for data analytics applications in the IoT. See Q. Xu, K. M. M. Aung, Y. Zhu, and K. L. Yong, "A blockchain-based storage system for data analytics in the internet of things," in *New Advances in the Internet of Things*. Springer, 2018, pp. 119-138, incorporated herein by reference in its entirety. Saphire makes use of a Blockchain to store IoT devices activity in a distributed way. Nonetheless, this work treats only the storage need, without consideration of IoT's security requirements.

DIaaS (Data Integrity as a Service) framework for IOT device is proposed by Liu et al. to provide data integrity with a fully decentralized Blockchain based service. See B. Liu, X. L. Yu, S. Chen, X. Xu, and L. Zhu, "Blockchain based data integrity service framework for iot data," in 2017 *IEEE International Conference on Web Services (ICWS)*, June 2017, pp. 468-475, incorporated herein by reference in its entirety.

In addition, research work related to combining the Blockchain with robots and UAVs is limited. The author in "The blockchain: a new framework for robotic swarm systems," introduced Blockchain in the field of robotics to solve security issues in swarm robotics. See E. C. Ferrer, "The blockchain: a new framework for robotic swarm systems," in *Proceedings of the Future Technologies Conference*. Springer, 2018, pp. 1037-1058, incorporated herein by reference in its entirety. However, only a high level description of the approach is provided and no implementation details or even simulations were described.

In Kapitonov et al., Blockchain is utilized to secure the communication among the system of autonomous unmanned air vehicles (UAV) allowing them to coordinate their actions, exchange data and collaboratively make decisions. See A. Kapitonov, S. Lonshakov, A. Krupenkin, and I. Berman, "Blockchain-based protocol of autonomous business activity for multi-agent systems consisting of UAVs," in 2017 *Workshop on Research, Education and Development of Unmanned Aerial Systems (RED-UAS)*, October 2017, pp. 84-89, incorporated herein by reference in its entirety.

The work in Sharma et al., presents the ideology of exploiting the features of the Blockchain to secure utilization of drones especially in ultra-dense environments. See V. Sharma, I. You, and G. Kul, "Socializing drones for inter-service operability in ultra-dense wireless networks using blockchain," in *Proceedings of the 2017 International Workshop on Managing Insider Security Threats*. ACM, 2017, pp. 81-84, incorporated herein by reference in its entirety.

Liang et al. combines public Blockchain and cloud storage to ensure the integrity of data collected using drones. See X. Liang, J. Zhao, S. Shetty, and D. Li, "Towards data assurance and resilience in iot using blockchain," in *MILCOM 2017-2017 IEEE Military Communications Conference (MILCOM)*, October 2017, pp. 261-266, incorporated herein by reference in its entirety.

However, there is a need for ensuring security and privacy of UAVs, their communication and data, and protect users that have access to status information of the UAVs, particularly in the context of limited resources in terms of computation, energy, memory, storage and processing capacity.

It is one object of the present disclosure to describe a blockchain-based Internet of Drones. The system secures UAVs information, messages (transactions/communications) and thereby ensures authentication and integrity of transmitted data. The system provides action traceability by storing UAVs activities and users actions in a distributed way. The system manages UAVs and Users identity in order to facilitate authentication between them. The identity management is used to verify and confirm each UAV identity and user identity. This allows wide tracking of UAVs and users and protect identity from theft.

SUMMARY

In an exemplary embodiment, a secure system for control of at least one unmanned aerial vehicle (UAV), includes a cloud service and a ground control station. The cloud service includes a cloud-based management service having processing circuitry configured to control communications between the cloud service, the ground control station and the at least one UAV, and control and monitor the at least one UAV by way of a corresponding said at least one UAV client device. The UAV client device receives messages from the at least one UAV, sends commands to the at least one UAV, verifies the sender of each of the received messages, creates a new block for each received message and sent commands as new transactions, including performs a consensus algorithm for the new block, determines a consensus to validate the new block, and updates a blockchain with the validated new block.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
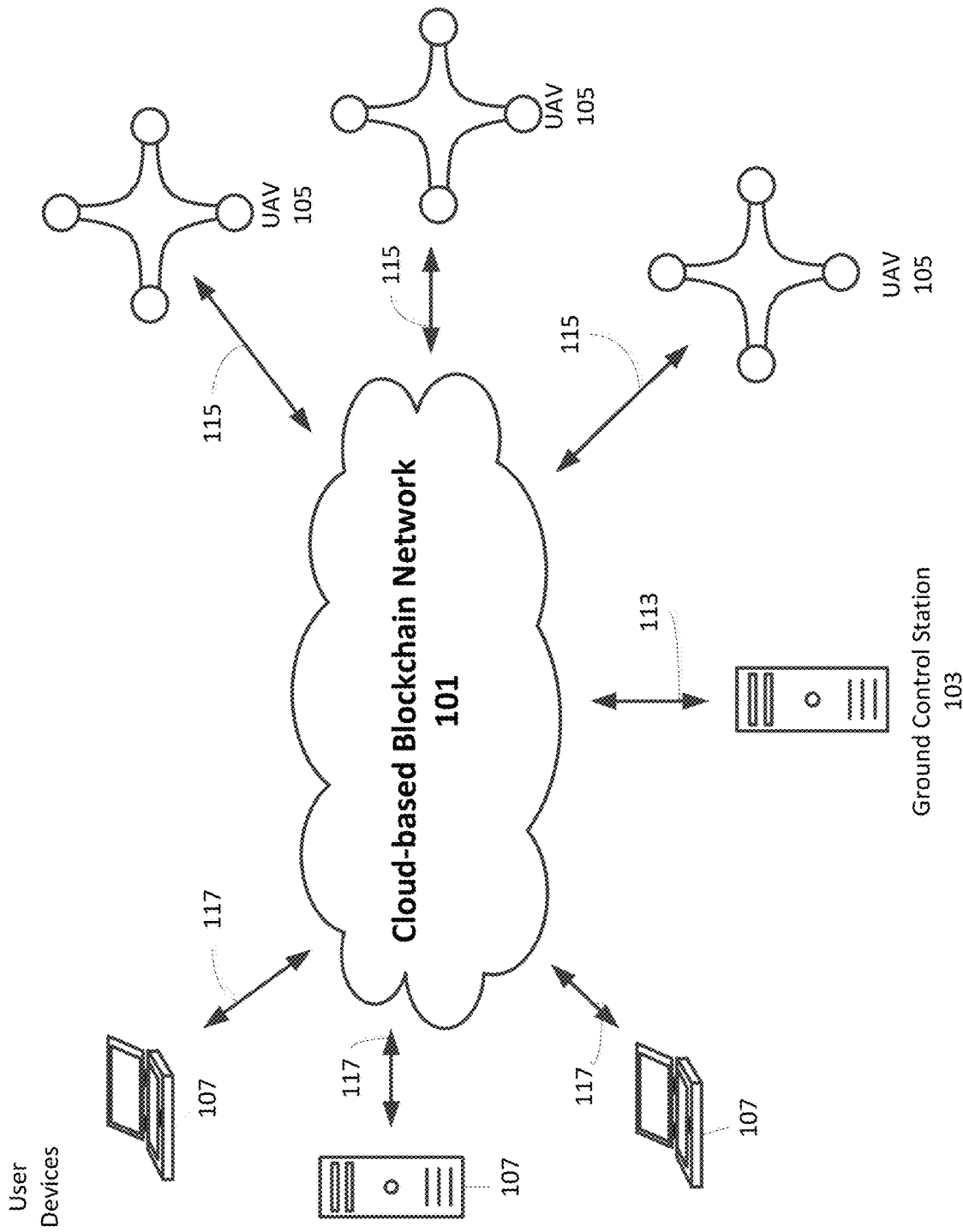
FIG. 1 is a diagram of an integrated system of UAVs and a blockchain network in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to integrated system of Blockchain technology and Internet of Drones (IoD). The integrated system secures UAVs state information and messages (transactions/communications), and ensures authentication and integrity of transmitted data. The integrated system provides action traceability by storing UAVs activities and users actions in a distributed way. The integrated system manages UAVs and Users identity in order to facilitate authentication between them. The identity management is used to verify and confirm each UAV identity and user identity. Thus, the integrated system allows wide tracking of UAVs and users and protects UAV and user's identity from theft.

FIG. 1 is a diagram for the architecture for the integrated system of Blockchain technology and IoD. The architecture includes four main components, including UAVs 105, one or more ground control stations 103, one or more user devices 107, and a Blockchain network 101. One or more UAVs 105 may collect and send a data signal to a ground control station (GCS) 103. Among the signals, the UAVs 105 may transmit telemetry data and status information over a transmission path 115 to the blockchain network 101 in the cloud. The GCS 103 may receive data signals from UAVs 105 and send out command and control data over a transmission path 113 to UAVs 105 via the blockchain network 101. User devices 107 may be provided with secure access 117 via the blockchain network 101 to the parameters and data of the UAVs 105. The Blockchain network 101 facilitates this data exchange between UAVs 105, ground control station 103, and user devices 107 as nodes that store and share the blockchain.

An aspect is an architecture that offloads heavy computations to be performed in the cloud while the UAV performs as a sensor and actuator. In particular, intensive computations associated with Blockchain technology may be performed in the cloud, while the UAV itself may perform actions and provide data as blockchain transactions.

A UAV 105 is a pilotless aerial vehicle which can be controlled autonomously by onboard computers or in a range of levels including remotely controlled by a pilot at the GCS 103. UAVs 105 may transmit data signals collected from various onboard sensors mounted on the UAV (current altitude, speed, map position, weather, wind speed) and flight status information (current mission status, energy) to GCS 105.

The GCS 103 is responsible for receiving data signal from UAVs 105 and send out command and control data to monitor and control each UAV 105 in flight, uploading new mission commands and setting parameters.

User devices 107 are third-party devices that have access to the parameters and data of the UAVs 105 and GCS 103 for various useful purposes.

The Blockchain network 101 facilitates a distributed immutable database of actions performed by user devices 107, data collected from UAVs 105 and commands from GCS 103. The recorded transactions are shared between the user devices 107, the UAVs 105 and the ground control station 103 as nodes in the network 101. In the disclosed architecture, the user devices 107, UAVs 105, and GCS 103 act as nodes, storing the whole Blockchain and participating in a consensus protocol to verify blocks.

An aspect is the use of the cloud to virtualize the UAV nodes through abstract interfaces. The virtual UAV nodes may perform the blockchain consensus algorithm and may store the whole blockchain. The blockchain consensus algorithm involves compute intensive operations and would require a computer system that is capable of performing these complex operations in a relatively short period of time. The whole blockchain may continue to grow and require an increasing amount of memory. Thus a computer system that is capable of increasing the amount of memory available for data storage is preferred.

The Blockchain is composed of cryptographically linked list of blocks created by the nodes. Each block may contain one or more transactions, including commands to UAVs and sensor and status data from UAVs. A block is identified by its cryptographic hash and it references the hash of the preceding block.

Figure 2:
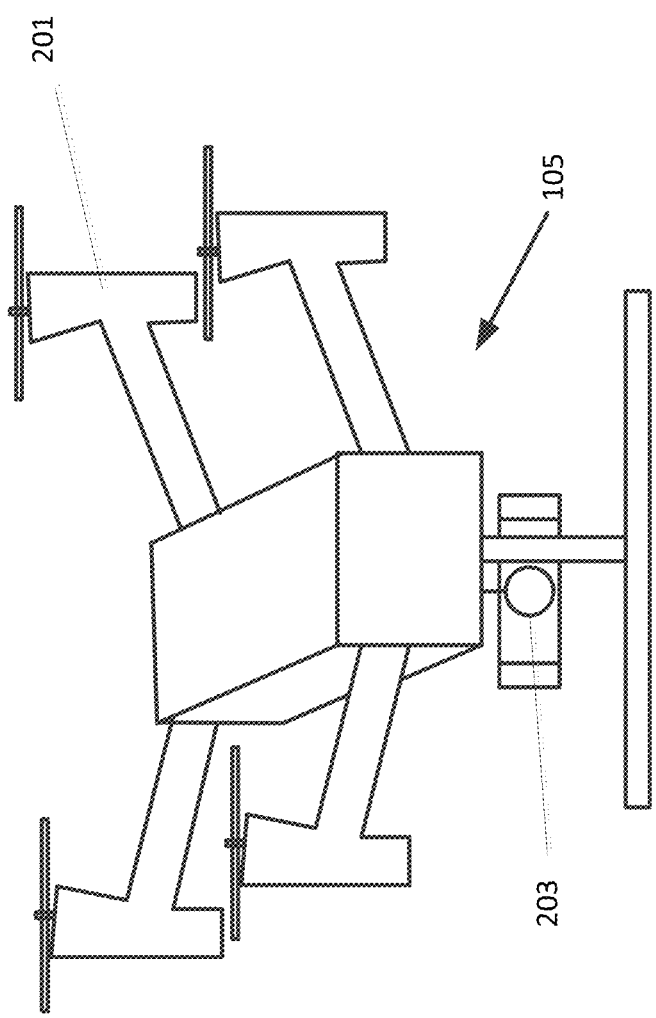
FIG. 2 illustrates an exemplary UAV.

FIG. 2 illustrates a non-limiting example of a UAV. A common type of UAV 105 is a quadcopter drone, a multi-rotor helicopter having four rotors 201 (vertically oriented propellers). A quadcopter drone may include a stabilized camera 203. As will be discussed later, a UAV includes internal communications and control equipment.

Figure 3:
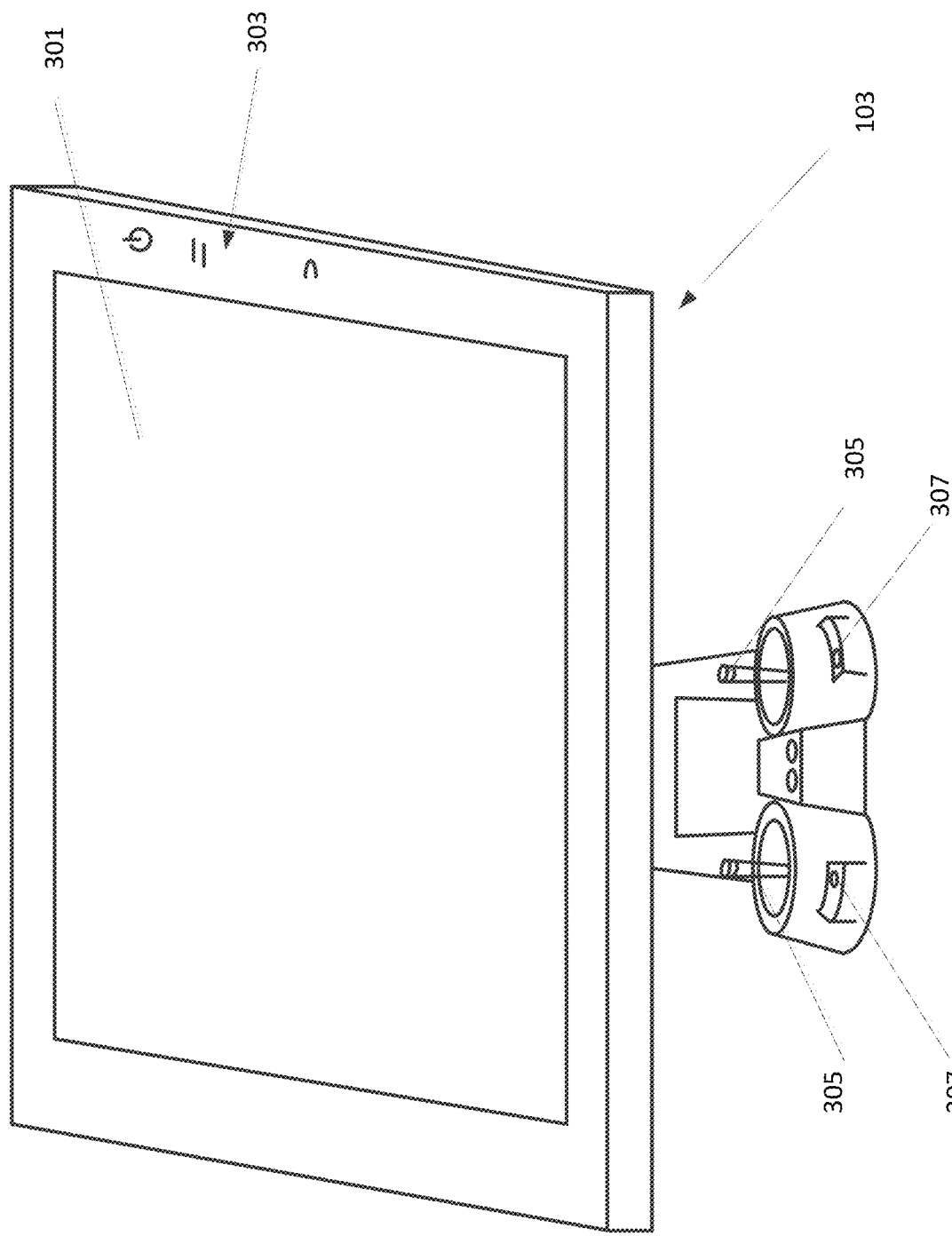
FIG. 3 illustrates a ground control station.

FIG. 3 illustrates a ground control station. A ground control station 103 may have various interactive controls for remotely controlling one or more UAVs. The ground control station 103 is an interactive display device including a display 301 controls for the display 303. In some embodiments the ground control station 103 may include physical levers 305 for remotely controlling direction of movement of a UAV and buttons 307 for rising/lowering a UAV. In some embodiments, levers and buttons for controlling movement of a UAV may be included as controls displayed in a touch screen display 716.

Figure 4:
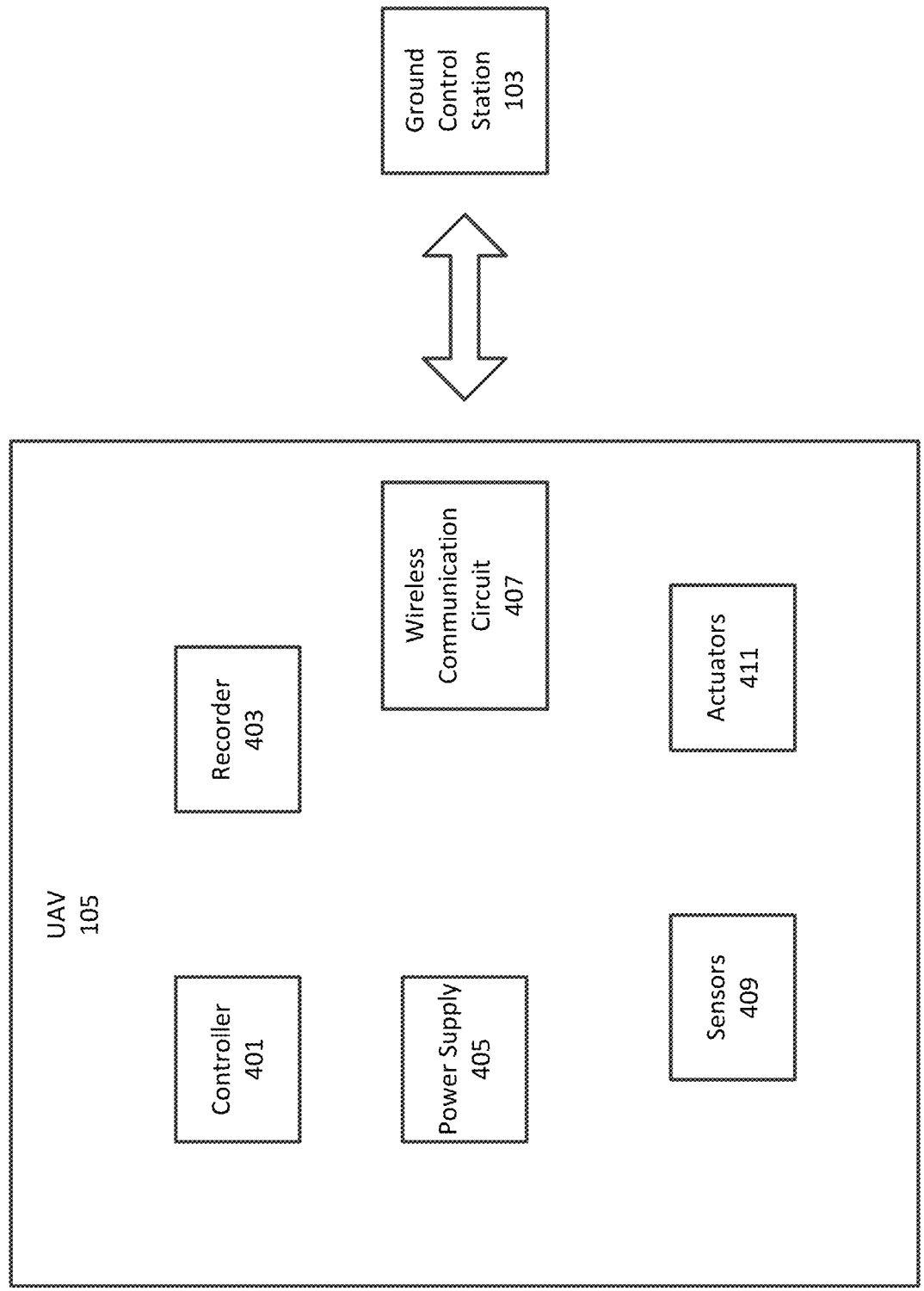
FIG. 4 is a block diagram of an exemplary UAV in communication with a ground control station.

FIG. 4 is a block diagram of an exemplary UAV in communication with a ground control station. A UAV 105 may be provided with various levels of control ranging from remote control by the ground control station 103 to fully autonomous control by a controller 401 based on a flight plan provided by the ground control station 103. Communication with the ground control station 103 may be through a wireless communication circuit 407. The wireless communication circuit 407 may be configured with a radio for remote control, and may also be configured with WiFi and Bluetooth interfaces as well as a global positioning system (GPS). The UAV 105 includes a power supply 405, and may include at least one sensor 409 and at least one actuator 411. The sensor 409 may be part of an inertial measurement unit (IMU) that includes an accelerometer, a gyroscope, and a magnetometer which may be used to estimate acceleration and speed of the UAV 105. The actuator 411 may include speed controllers that independently control speed of each rotor. The UAV may also include a recorder 403.

Figure 5:
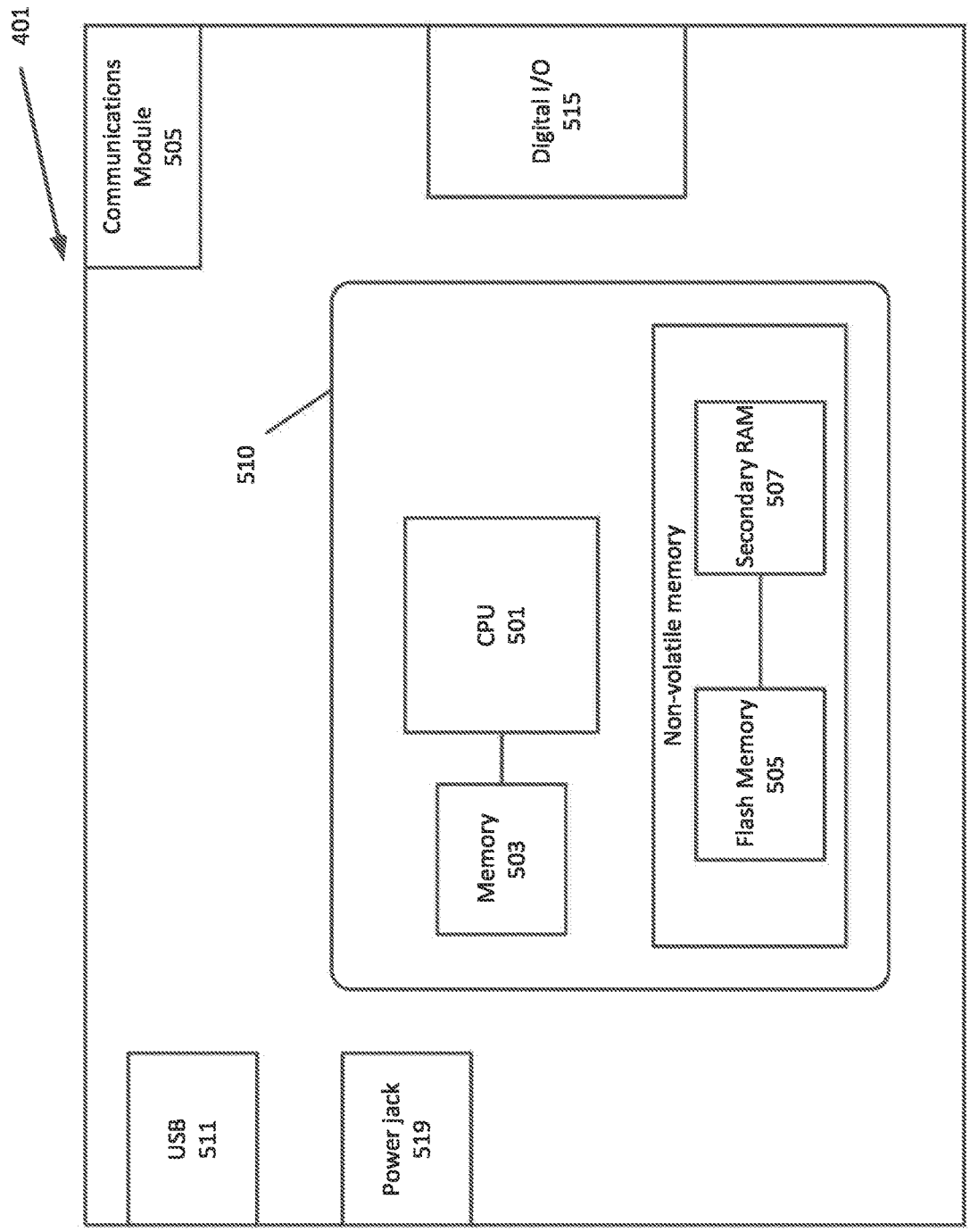
FIG. 5 is a block diagram of an exemplary controller for an UAV.

FIG. 5 is a block diagram of an exemplary controller for an UAV. The computer-based controller 401 may be based on a microcontroller or microprosessor. A microcontroller or microprocessor may contain one or more processor cores 501 (CPUs) along with memory 503 (volatile and non-volatile) and programmable input/output peripherals 718. Program memory in the form of flash 505, ROM, EPROM, or EEPROM is often included on chip, as well as a secondary RAM 507 for data storage. In one embodiment, the computer-based system 401 is single board computer. The board includes a communications module 510, digital I/O pins 515, a USB connection 511, and a power jack 519. Variations can include the number of pins, whether or not the board includes communication ports or a reset button.

The microcontroller or microprocessor may range from a 8-bit RISC-based microcontroller to a multiple core 64-bit microprocessor. The microcontroller may be configured with flash memory 503, SRAM 507, general purpose I/O lines, general purpose registers, a real time counter, flexible timer/counters, a A/D converter, and a JTAG interface for on-chip debugging. The microcontroller may be a single high throughput SOC that operates at a low voltage. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

Figure 6:
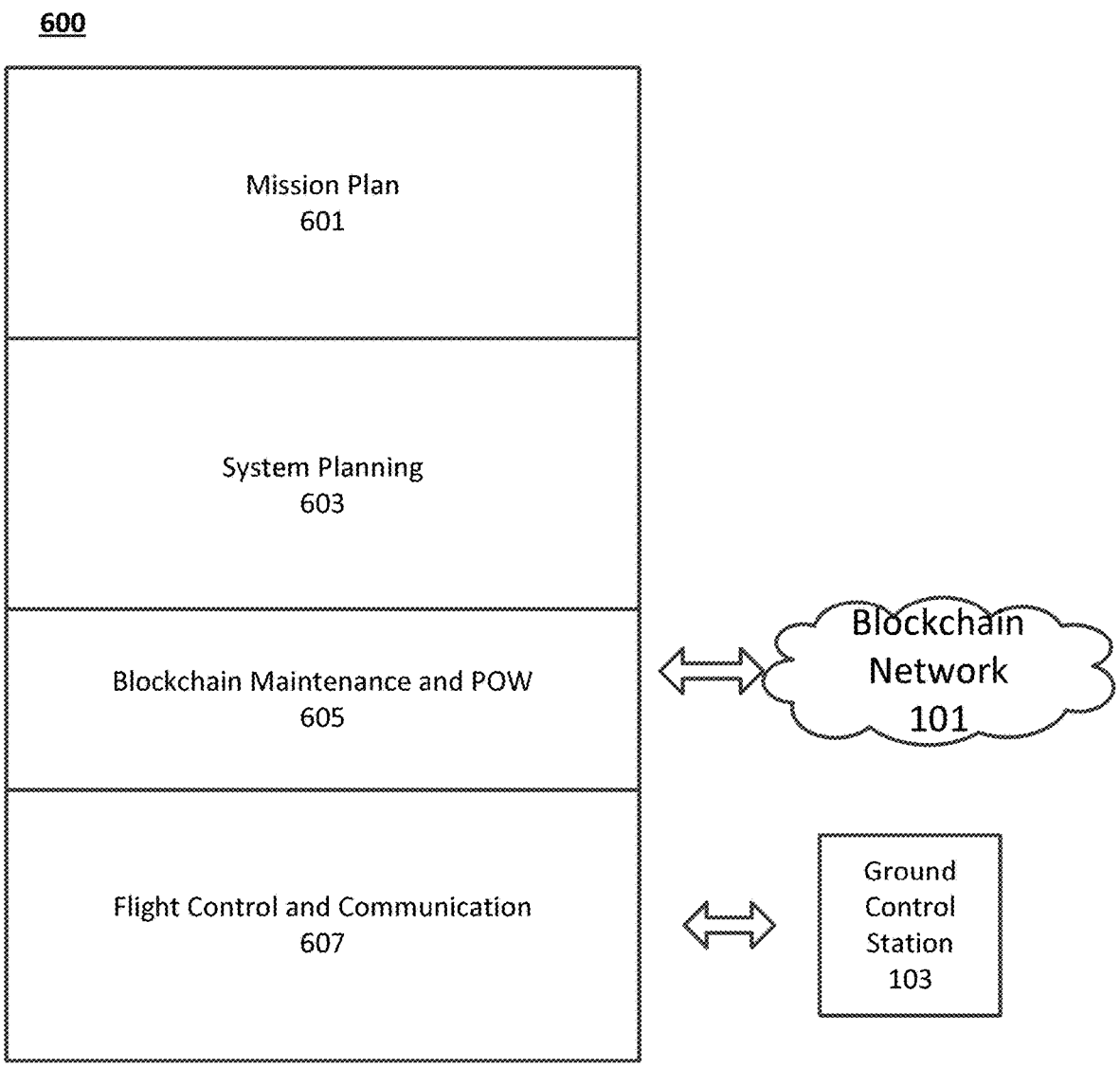
FIG. 6 is an exemplary control hierarchy for a UAV in accordance with an exemplary aspect of the disclosure.

FIG. 6 is an exemplary control structure 600 for a UAV in accordance with an exemplary aspect of the disclosure. As mentioned above, a UAV 105 may be provided with various levels of control ranging from remote control by the ground control station 103 to fully autonomous control by a controller 401 based on a flight plan provided by the ground control station 103. Subsequently, UAV may he a remotely piloted aircraft or fully autonomous, or may have various intermediate degrees of autonomy. For example, a UAV may be remotely piloted in most contexts but may have an autonomous return-to-base operation. Blockchain maintenance and proof of work 605 may be performed at various levels of autonomy. In some embodiments, blockchain maintenance and proof of work 605 may be completely performed in a virtual UAV in the cloud 101. Also, the path of a UAV may be planned 601 to meet mission objectives. In sonic embodiments, control maneuver planning by a system planning component 603 may he determined in order to follow the planned path by the UAV or remotely controlled from the ground control station. In some embodiments, a flight control component 607 may perform flight control, such as stability, maneuvers and communication may best be performed by the UAV.

Figure 7:
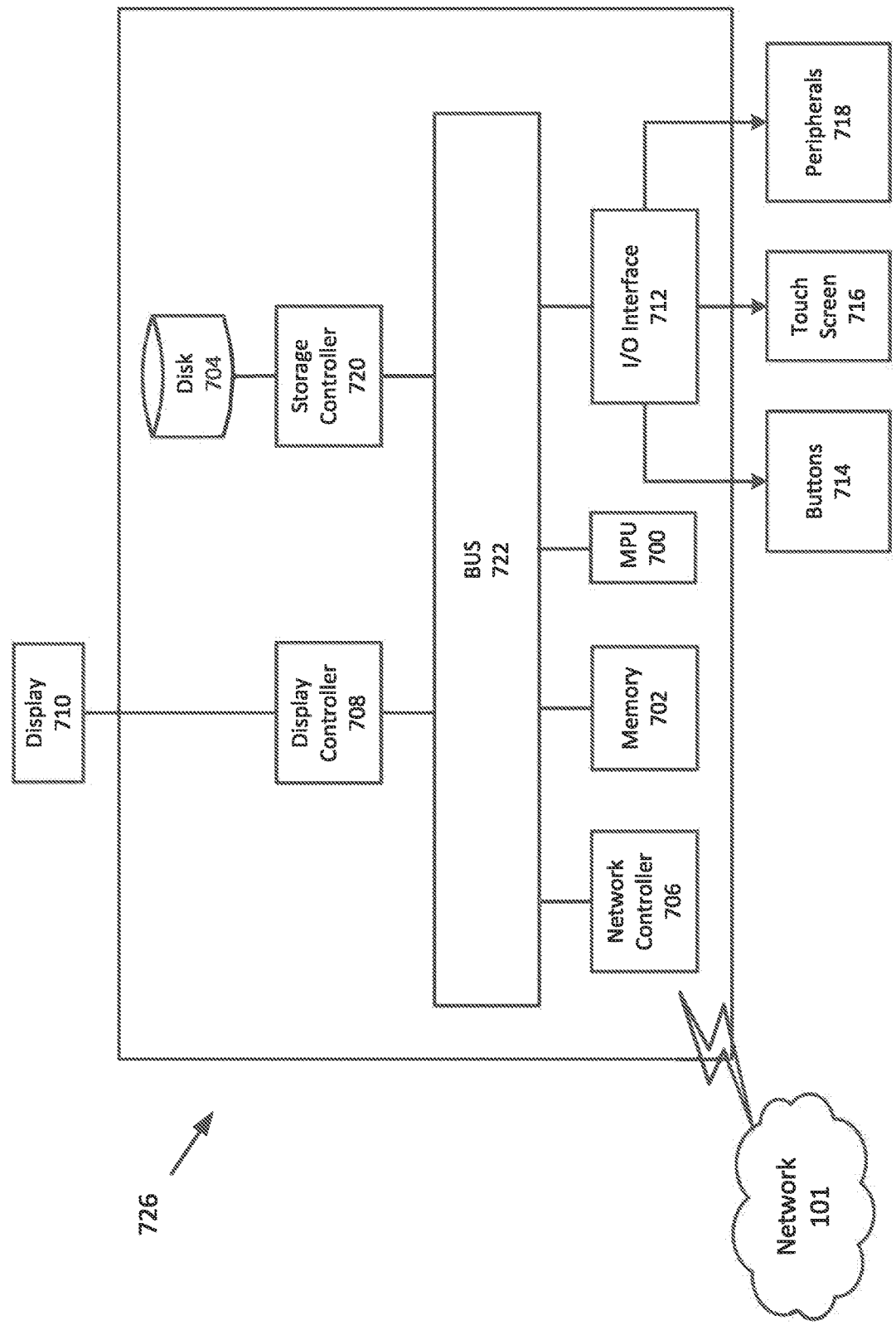
FIG. 7 is a block diagram for an exemplary user device.

FIG. 7 is a block diagram for an exemplary user device. In one implementation, the functions and processes of the mobile device 107 may be implemented by one or more respective processing circuits 726. A processing circuit includes a programmed processor as a processor includes circuitry. A processing circuit may also include devices such as an application specific integrated circuit (ASIC) and conventional circuit components arranged to perform the recited functions.

Next, a hardware description of the processing circuit 726 according to exemplary embodiments is described with reference to FIG. 7. In FIG. 7, the processing circuit 726 includes a Mobile Processing Unit (MPU) 700 which performs the processes described herein. The process data and instructions may be stored in memory 702. These processes and instructions may also be stored on a portable storage medium or may be stored remotely.

Further, the claimed advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk 704 or any other information processing device with which the processing circuit 726 communicates, such as a server or computer.

Further, the claimed advancements may be provided as a utility application, background daemon, or component of an operating system, or combination thereof, executing in conjunction with MPU 700 and a mobile operating system such as Android, Microsoft® Windows® 10 Mobile, Apple iOS® and other systems known to those skilled in the art.

In order to achieve the processing circuit 726, the hardware elements may be realized by various circuitry elements, known to those skilled in the art. For example, MPU 700 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 700 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 700 may be implemented as multiple processors cooperatively working in parallel to perform the instructions of the inventive processes described above.

The processing circuit 726 in FIG. 7 also includes a network controller 706, such as an Intel Ethernet PRO network interface card from Intel Corporation of America, for interfacing with network 101. As can be appreciated, the network 101 can be a public network, such as the Internet, or a private network such as LAN or WAN network, or any combination thereof and can also include PSTN or ISDN sub-networks. The processing circuit may include various types of communications processors for wireless communications including 3G, 4G and 5G wireless modems, WiFi®, Bluetooth®, GPS, or any other wireless form of communication that is known.

The processing circuit 726 further includes a display controller 608, such as a NVIDIA® GeForce® GTX or Quadro® graphics adaptor from NVIDIA Corporation of America for interfacing with display 710. An I/O interface 712 interfaces with buttons 714, such as for volume control.

The communication bus 722, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 726. A description of the general features and functionality of the display 710, buttons 714, as well as the display controller 708, storage controller 720, network controller 706, and I/O interface 712 is omitted herein for brevity as these features are known.

The disclosed integrated system incorporates a blockchain network into an Internet of Drones which provides the ability to record UAV parameters and activities, log GCS's control commands and track users actions in a secure manner, as well as secure the identity of UAVs. The integrated system includes features of:

Decentralization: UAVs, GCS and users can communicate and exchange data directly through a secure and trusted Blockchain without any third party entity involvement. Moreover, data is distributed across Blockchain network, rather than storing it in central server.

Collective verification: Because of Blockchain's distributed characteristics, transaction data may be approved and verified by network nodes before this transaction is recorded in the Blockchain, thus eliminating the need for a controlling authority.

Tamper resistance: Transaction data are stored on the Blockchain, which makes tampering with data that much more difficult, data cannot be modified or deleted if they have been recorded on the Blockchain. Moreover, tampering of data are extremely challenging because Blockchain relies on cryptographic techniques.

Data Integrity: Ensuring data integrity means guaranteeing secure transmission and storage. In Blockchain, Cryptographic Hash Functions are used to ensure the integrity of the data transmitted by IoD devices. The integrity of this data is also guaranteed by the consensus algorithm used in the block mining process. See S. Shetty, X. Liang, D. Bowden, J. Zhao, and L. Zhang, "Blockchain-based decentralized accountability and self-sovereignty in healthcare systems," in *Business Transformation through Blockchain.* Springer, 2019, pp. 119-149, incorporated herein by reference in its entirety. On the other hand, once the data or information is written in a block, it can no longer be deleted or modified since its integrity is intrinsically provided by the way it is chained to other blocks.

Availability: Integrating Blockchain technique in IoD enables higher availability because of Blockchains distributed characteristics, considering that multiple copies of the entire ledger are stored on each distributed node in the Blockchain network. If an UAV is under attack, the rest of Blockchain nodes keep on working and data is always available.

Data origin Authentication: All nodes in Blockchain are capable of verifying the authenticity of the data transmitted and have the certainty that they have not been tampered, with the help of digital signature cryptography, eliminating the need of third-party authentication. Thus, data authentication between UAVs, GCS and users is guaranteed.

Identity management: Identification of nodes can be granted by using Blockchain through the use of pseudonymous addresses similar to Bitcoin addresses.

Privacy: In Blockchain, transaction history is publicly available and any node can join and access details about transactions, but it cannot access identifying information about the node making those transactions.

Blockchain Technology

The Blockchain is a shared, tamper-proof distributed ledger for recording and tracking transactions and sharing them in a network. In this disclosure, the ledger is distributed among user devices 107, ground control station 103 and UAVs 105. The completely distributed and autonomous nature of Blockchain and Blockchain operation enables UAVs, GCSs and user devices to communicate with each other in a secure manner and sign transactions without relying on a third-party for processing or verification of transactions. Transactions may include commands 113 to the UAV, transmissions 117 by user devices, and sensor signals 115 from a UAV. These transactions are stored on a distributed ledger which may include cryptographically linked blocks of transactions referred to as the Blockchain (BC). BC is an attractive technology for addressing the mentioned security and privacy challenges in IoD as a result of its key features including decentralization, anonymity and security. In order to use a Blockchain, it is first required to create a P2P network with all the nodes interested in making use of such a Blockchain. In one disclosed embodiment, the user devices 107, UAVs 105, and GCS 103 may act as nodes. In some embodiments, compute intensive processing and storage in memory for the UAVs 105 may be performed by virtual UAVs performed in the cloud 101, depending on the processing capability of the UAV 105.

Figure 8:
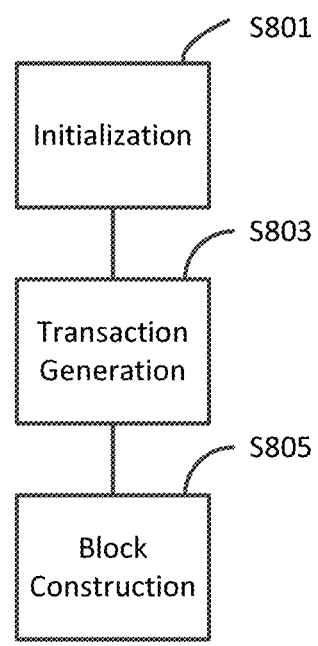
FIG. 8 is a flowchart for operation of the integrated system of UAVs and a blockchain network in accordance with an exemplary aspect of the disclosure.
Figure 9:
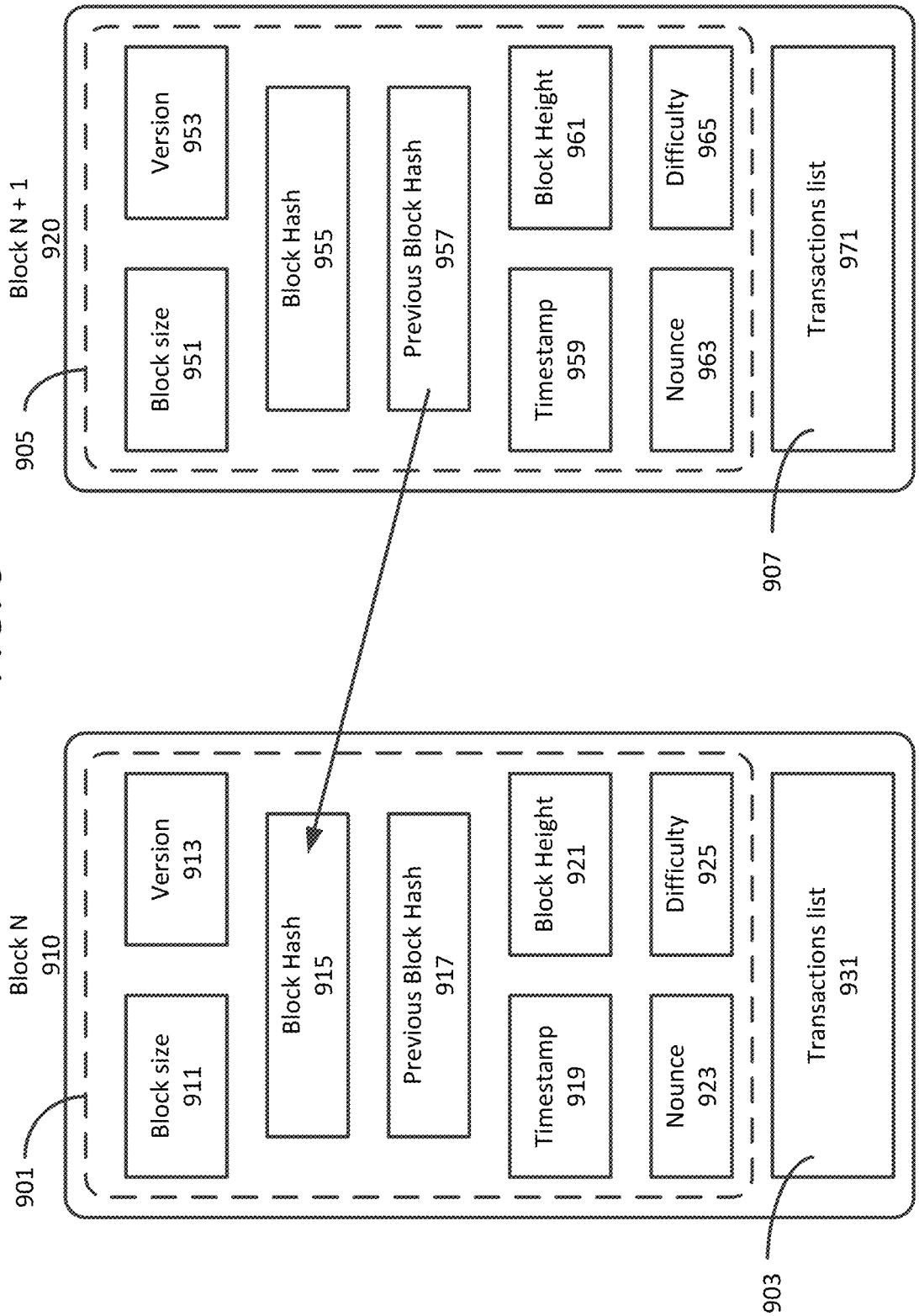
FIG. 9 is a block diagram of a blockchain structure in accordance with an exemplary aspect of the disclosure.

FIG. 8 is a flowchart for operation of the integrated system that integrates UAVs and a blockchain network in accordance with an exemplary aspect of the disclosure. In S801, each node starts by generating a pair of keys, public and private based on an encryption algorithm, such as the RSA algorithm. In S803, the node that initiates a transaction would record the data. In S805, to successfully add a new block in the Blockchain, the miners first verify (also known as mine) a block by solving a computationally difficult Proof of Work (PoW) puzzle A. Block Structure FIG. 9 is a block diagram of the structure of the blockchain in accordance with an exemplary aspect of the disclosure. The Blockchain is a continuously growing list of records called blocks, 910 and 920, which are linked and secured using cryptography. In the Blockchain, a block is used to securely store information. The structure of a block may be composed of two parts, block header, 901 and 905, and a list of transactions, 903 and 907, as shown in FIG. 9. The block header is composed of the Block size, version, hash of the previous block, nonce, difficulty, Timestamp, Block height and Block hash, which are stored to identify the block and its position in the chain.

Block size 911 and 951: contains the size of the entire block.

Version 913 and 953: indicates which set of validation rules to follow for a particular data type.

Hash of the previous block 917 and 957: is a cryptographic link that creates the chain (sequence of blocks) and makes it tamper-proof. The linked blocks make the previous and future blocks dependent on each other which guarantees a block's integrity and data authenticity.

Nonce 923 and 963: is an arbitrary number that nodes generate to modify the header hash in order to produce a hash below the target difficulty. The nonce is used by Blockchain nodes to check the integrity of the block preventing a replay attack.

Difficulty 925 and 965: is the difficulty target value for the solution of PoW algorithm, which specifies the number of leading zeros.

Timestamp 919 and 959: is the time when the block was created.

Block height 921 and 961: The height represents the block index in the global Blockchain network.

Block hash 915 and 955: The block hash is not stored in the block's data structure and is also not sent over the network, instead is calculated by each node upon receipt of a new block. After that, they store it in a separate database as part of the block metadata.

Transactions 931 and 971: Transaction lists come after the block header. Transactions are the actions created by the nodes in the network. Each transaction is broadcasted to a Blockchain network and is collected into blocks.

System Architecture

In what follows, the general system architecture is disclosed, then the software architecture and details of different components are disclosed.

Figure 10:
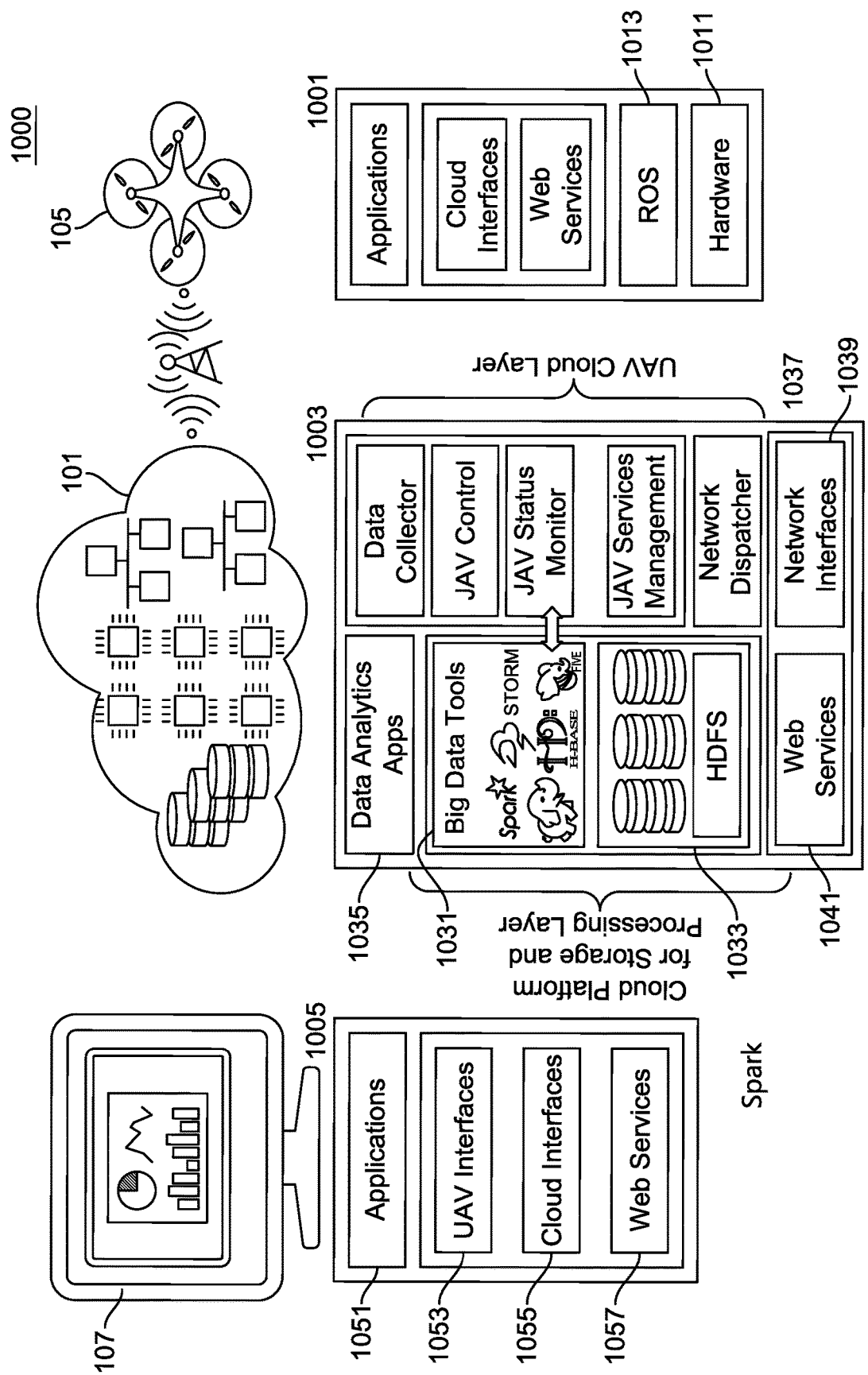
FIG. 10 is a block diagram of a system architecture in accordance with an exemplary aspect of the disclosure.

FIG. 10 is a block diagram of a system architecture 1000 in accordance with an exemplary aspect of the disclosure.

The UAV Layer: The UAV layer 1001 represents a set of resources exposed as services to the end-user. The UAV has several layers of abstractions. On top of the hardware 1011, ROS 1013 and MAVLink provide both two different means as the first layer of abstraction that hides hardware resources (i.e. sensors 309 and actuators 311). Robot Operating System 1013 (ROS) is a middleware for robotics applications and represents an important milestone in the development of modular software for robots. In fact, it presents different abstractions to hardware, network and operating system such as navigation, motion planning, low-level device control, and message passing. On the other hand, MAVLink is a communication protocol built over different transport protocols (i.e. UDP, TCP, Telemetry, USB) that allows the exchange of pre-defined messages between the drones and ground stations, which provide a high-level interface for applications developers to control and monitor drones without having to interact directly with hardware. These two alternatives allow software developers to focus more on the high-level development without having to deal with hardware issues.

Cloud Services Layer 1003: Three sets of components are defined: (1) Storage components 1031: This set of components provides storage for streams of data originated from UAVs and captured by this layer. Each UAVs environment variables, localization parameters, mission information, and transmitted data streams including sensor data and images with time-stamps are stored in the cloud 101 either in a regular SQL database or in a distributed file system (i.e. HDFS, NoSQL database such as HBase), depending on the application's requirements. Storage in distributed file systems helps to perform large-scale batch processing on stored data using tools 1035 like Hadoop Map/Reduce.

There are two types of data processing 1033 on the cloud computing infrastructure: (i.) Real-time stream processing: the cloud 101 processes incoming streams of data for detecting possible critical events or threats that require immediate action or performs dynamic computation in a distributed environment. Examples of real-time stream processing could include processing sample images received from the UAV to detect possible threat (i.e. intruder into an unauthorized area) or also processing sensor data (e.g. high temperature value in case of fire). Another possible application of real-time processing might be required when new events are detected and require the dynamic re-scheduling of drones' missions to ensure the optimality of the missions' executions after considering the new events. (ii.) Batch processing: Incoming data is stored in the HDFS distributed file system for increased reliability as well as post-processing using a distributed parallel computing approach. Batch processing can be used to look for particular events in the log file, for example, how many intruders detected in an unauthorized area over a certain period of time. The cloud services layer implements a cluster of compute nodes running Hadoop HDFS. All data is stored in various tables using NoSQL in Hbase. (2) Computation components: Various computation intensive algorithms are deployed in the cloud 101. Image processing libraries process stored data available in HBase to detect possible event. In addition, Map/Reduce jobs running on the Yarn cluster allow applications to run in parallel reducing the processing time, therefore improving performance. Additionally, Data Analytics algorithms can be executed on the stored set of large scale data. (3) Interface components 1037: three sets of interfaces are defined as part of this component. (i.) Network interfaces 1039 implement network sockets and Websockets interface on the server side. These provide listening to JSON serialized messages sent from UAVs. In particular, Websockets are the most appropriate protocol to reliably handle streaming applications. MAVLink messages may be received from the drones through network sockets (UDP or TCP), and then forwarded to the client application through Websockets. A reason behind this strategy is that Websockets are supported by all programming languages (e.g. Java, Python, C++) including Web technologies. The use of UDP or TCP sockets for streaming to the client will induce more restrictions to the development of Web client applications. (ii.) The Web Services interfaces 1041 allow clients to control the missions of the drones and their parameters. Both SOAP and REST Web Services are used to provide the end-users and client applications different alternative to control and monitor the drones through invocation of Web Services. While network interfaces are used to mostly handle continuous streams, Web Services are used for sending control commands to the drones and getting information from the cloud 101.

Client Layer: The client layer 1005 provides interfaces for both end-users and drones' applications developers. For end-users, the client layer 1005 runs client side Web applications 1051, which provide interfaces 1055, 1053 to the cloud services layer as well as the UAV layer. Users have access to registering multiple UAVs, defining and modifying mission parameters and decision making based on data analysis provided by the cloud 101. The application 1051 allows users to monitor and control the UAVs and their missions remotely. Front-end interfaces provide the functionalities to the user to connect/disconnect, use available physical UAVs and their services, configure and control a mission and monitors the parameters of the UAV. For developers, the client layer provides several APIs 1057 for different programming languages to easily develop drones' applications and interact with their drones.

Figure 11:
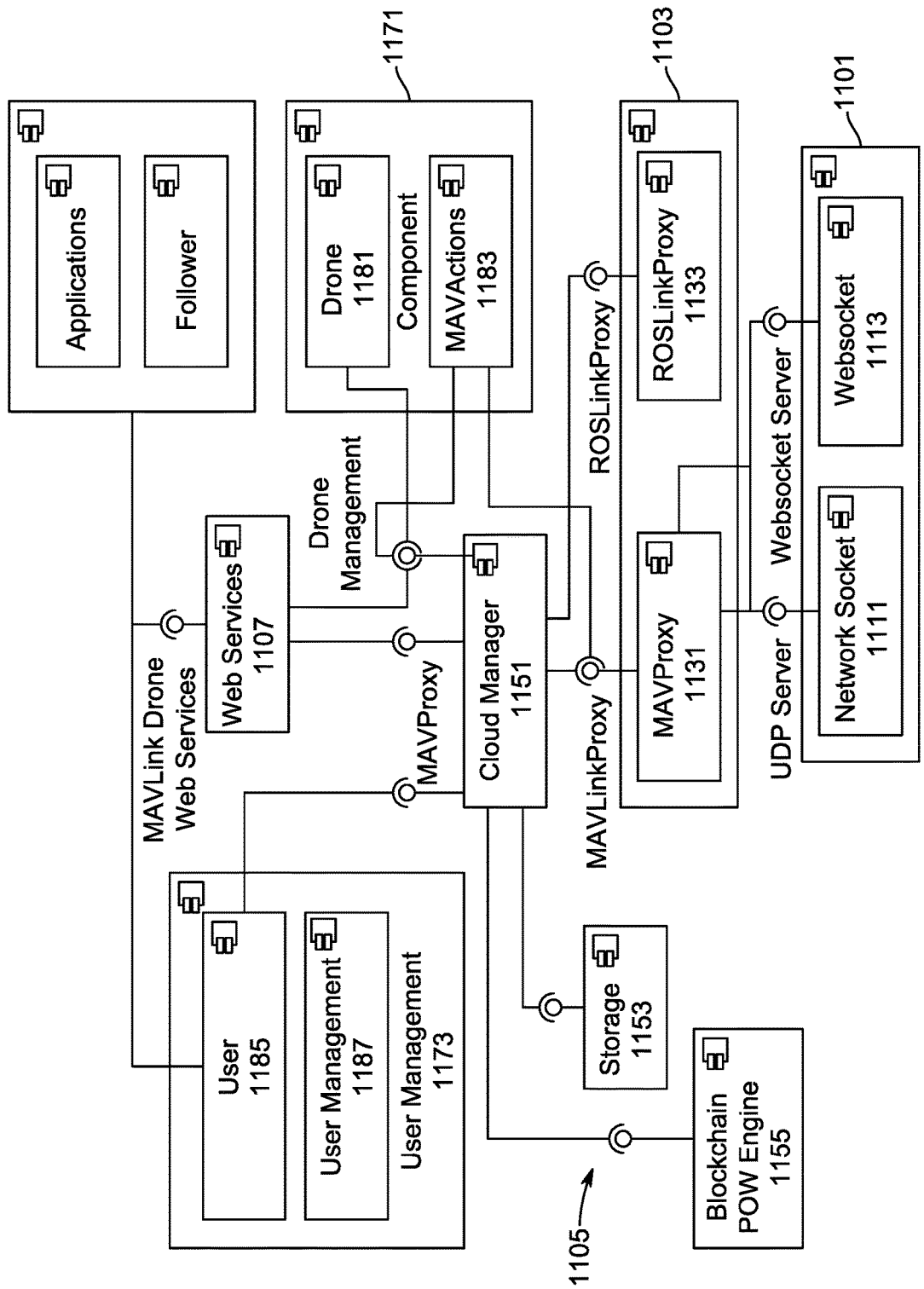
FIG. 11 is a block diagram of a software architecture in accordance with an exemplary aspect of the disclosure.

FIG. 11 is a block diagram of software architecture in accordance with an exemplary aspect of the disclosure. The software system is decomposed into four main subsystems (or layers), each of which contains a set of components. These subsystems are:

Communication: The communication subsystem 1101 represents the basic building block for network communications between the drones 105, users 107 and the cloud 101. There are two main components, namely (i.) Network sockets 1111 and (ii.) Websockets 1113. On the one hand, Network sockets allow agents (drones 105, users 107, and cloud 101) to exchange JSON serialized messages between each other through the network interface using sockets. The use of JSON message format is beneficial for interaction between heterogeneous systems as it is platform-independent and less verbose than XML. On the other hand, Websockets 1113 interfaces are used to handle data streaming between the cloud 101 and the user applications 107. Websockets technology is used because it is supported by different programming languages including Web technologies.

Proxy: The proxy layer 1103 acts on top of the communication layer and incorporates all the protocol-related operations including message parsing, dispatching, and processing. This layer supports two protocols. The first protocol is the MAVLink communication protocol, which is for communication between ground stations 103 and drones 105. The MAVLink protocol is based on binary serialization of messages and operates on different transport protocols, namely, UDP, TCP and serial. The second protocol is the ROSLink protocol, which is a protocol that has been developed to ensure interaction between a UAV 105 and a ground or control station 107. ROSLink is very much inspired from the MAVLink protocol in the sense that it implements a client in the UAV 105 that keeps sending JSON serialized messages to the ground station 103.

Cloud: The cloud layer 1105 is responsible for managing all the computing, storage and networking resources. It is composed of four components, namely (i.) Cloud Manager 1151, (ii.) Storage 1153, (iii.) Web Services 1107 components and (iv.) Blockchain Consensus Engine 1155. The central component of the cloud layer 1105 is the Cloud Manager 1151 component, which orchestrates all the processes and links all other components together. It uses the interfaces provided by MAVProxy 1131 and ROSLinkProxy 1133 components, in addition to the storage component 1153. On the other hand, it provides interfaces to the Drone 1171 and Users 1173 components, so that they do have access to MAVProxy 1131, ROSLinkProxy 1133 and Storage 1153 components. The main role of the Storage 1153 component is to provide interfaces to store data in different storage media including SQL/NoSQL databases and distributed file storage, i.e. HDFS. Different types of data need to be stored, retrieved and accessed. For example, SQL databases may be used to store information about users, and their credentials, or also information about drones and their missions. NoSQL databases (e.g. MongoDB) are used for more unstructured data such as data collected from the drones' sensors for further analysis. HDFS storage can be used to store data that requires further batch processing using distributed computing techniques, like Map/Reduce. For example, data related to drones' missions can be dumped from SQL or NoSQL databases to HDFS to process it either with batch processing system like Map/Reduce or real-time processing systems like Storm, and extract useful information for dumped data.

The Blockchain Consensus Engine (BE) 1155 component performs a compute intensive consensus algorithm of the blockchain. For example, the BE component may include algorithms for performing proof of work.

The Web Services (WS) 1107 component is the main interface between the cloud 101 and the client applications 1173 (i.e. on user devices 107). It provides platform-independent interfaces to end users and leverages the use of the service-oriented architecture (SOA) paradigm. Both SOAP and REST Web Services are defined. The REST API was designed to allow accessing cloud public resources through simple HTTP requests. The SOAP API was designed for a more formal and structured service-orientation for remote procedure invocation, which is basically used to send commands to the drone 105 from the client application 107. There have been long discussions about the pros and cons of REST and SOAP Web Services and the reader may refer to Pautasso et al. "REST vs. SOAP: Making the Right Architectural Decision" by Cesare Pautasso, SOA Symposium 2008, Amsterdam, October 7-8, (www.jopera.org/files/soa-amsterdam-restws-pautasso-talk.pdf) for more details. In the disclosed architecture, both types of Web Services are provided as interfaces with end-users to give more flexibility to users.

Drone: The Drone subsystem 1171 contains all information related to UAVs 105 and actions that could be performed on them. The Drone component 1181 represents resources in the cloud 101. This resource is basically accessed by client applications 1173 through Web Services 1107. In addition, the MAVAction 1183 component represents all the MAVLink protocol actions that could be executed on the UAV 105 including taking-off, landing, waypoint navigation, getting waypoints list, changing operation mode, etc. The Drone component 1181 maintains the status of the UAV 105, which is updated whenever a new MAVLink message is received. In addition, it provides an interface to access and modify the parameters of a UAV. Note that the cloud manager 1151 maintains a list of UAVs in a map data structure, as mentioned above.

User: The User subsystem 1173 contains information about users that access the cloud 101. Each user should be registered to the cloud 101 to have access to UAVs based on his/hers profiles and privileges. A user might be able to control a single UAV, or multiple UAVs or all UAVs based on his/hers privileges. The mapping between UAVs and users is made through the Cloud Manager 1151 during the registration of the user to the system, and based on approval of the cloud administrator. There are different possible strategies of mapping between users and UAVs, namely: (i.) Single User/Single UAV, where one user is allowed to access and control a single physical UAV, (ii.) Single User/Multiple UAVs, where one user is allowed to access and control multiple physical UAVs, (iii.) Single User/Virtual UAV(s), where one user is not allowed to control a physical drone, but sends its request to the cloud, which will decide on which UAV(s) to execute the mission of the user. Each user may have an access key that allows him to access a certain UAV resource over the cloud or to develop applications for a particular UAV resource. The access to UAV resources on the cloud is given to the users either through SOAP and REST Web Services to execute commands, or through Websockets to receive drones' MAVLink data streams.

B. Blockchain Implementation Steps

Figure 12A:
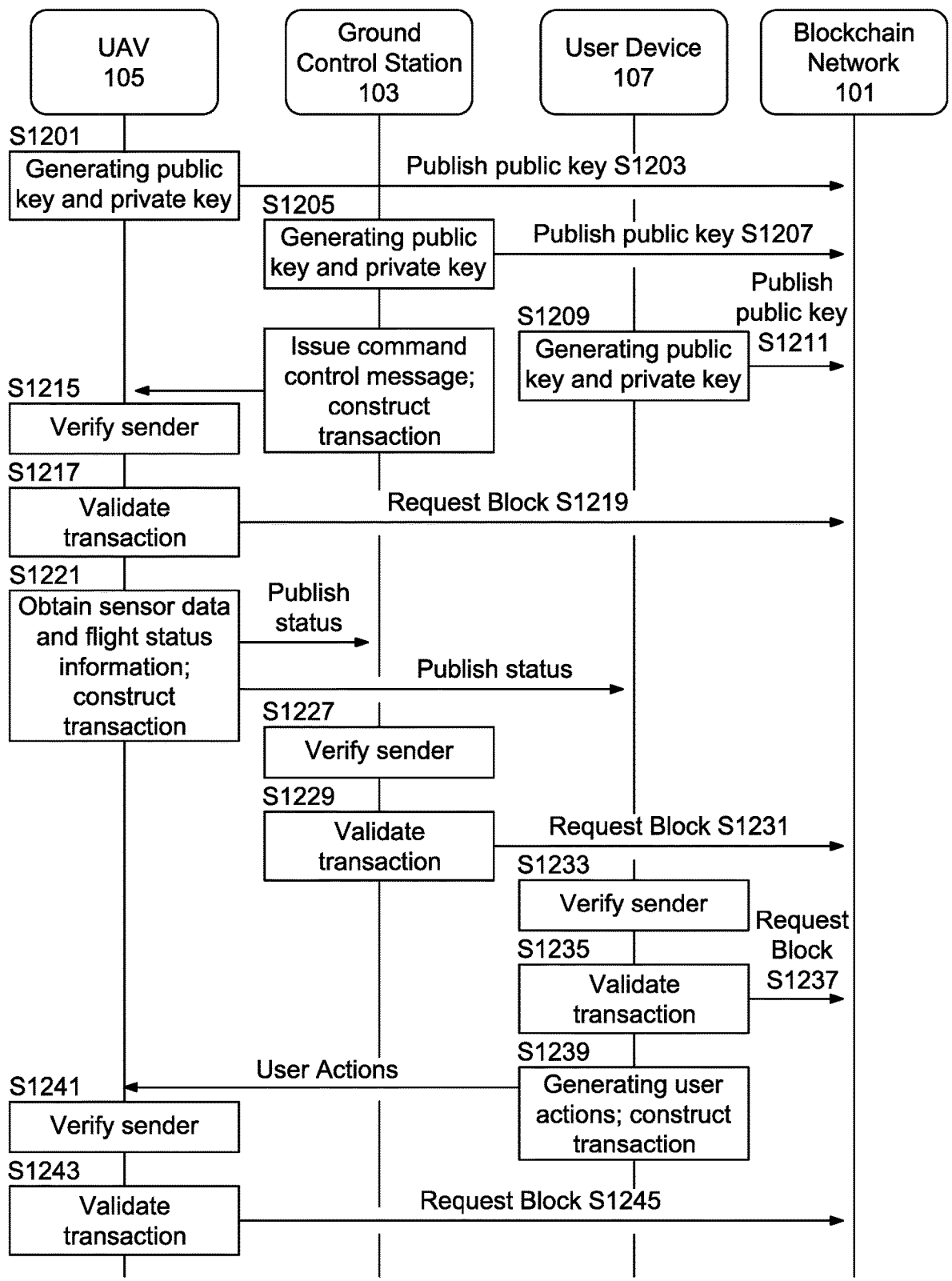
FIGS. 12A and 12B are a sequence diagram for operation of the integrated system of UAVs and a blockchain network in accordance with an exemplary aspect of the disclosure.
Figure 12B:
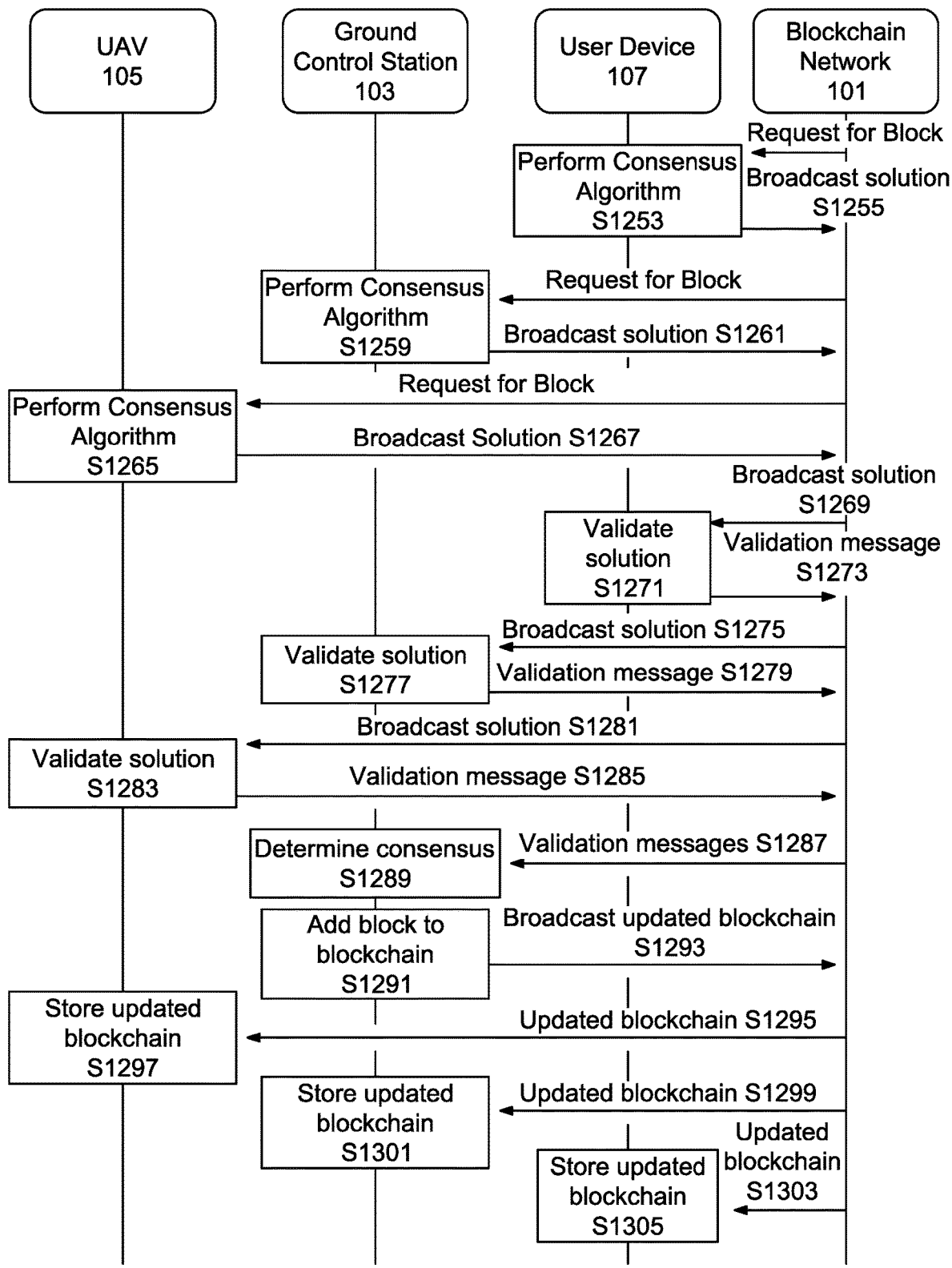

In disclosed embodiments, a Blockchain network is implemented for IoD using the UAVs, GCS and user devices as nodes in a network and encapsulating their transactions in blocks. In some embodiments, the UAVs 105 are virtualized so that intensive processing associated with blockchain may be offloaded. FIGS. 12A and 12B are a sequence diagram for operation of the integrated system of UAVs 105 and a blockchain network 101 in accordance with an exemplary aspect of the disclosure.

1) Initialization S801: Each node (105, 103, 107) starts by, in S1201, S1205, S1209 generating a pair of keys, public and private, based on an encryption algorithm, such as the RSA algorithm. In the RSA algorithm, a public key is a node's main accessible information, is publicly available in the Blockchain network, can be regarded as a nodes' unique address on the Blockchain, used by the other nodes for encrypting the messages sent to a node and used to validate the data in the verification phase of the transaction, consequentially confirming data authenticity. Thus, in S1203, S1207, S1211, each node publishes its public key to the Blockchain Network 101. The private key is the nodes secret information, only known by the owner node and is used for signing Blockchain transactions to encrypt the data. Thus, only the node with the proper private key is able to decrypt the messages encrypted with the corresponding public key.

2) Transaction Generation S803: The node that wants to initiate a transaction would record the data. Transactions are the data packages that store UAVs data (data signals, flight status information), GCS data (command and control data) and user's data (actions performed by users, user identity). Once a node creates a transaction (e.g., Ground Control Station 103 in S1221, it signs it with the private key and then broadcasts it to the Blockchain network 101. In one embodiment, the physical UAVs 105 send data signals and flight status information to the corresponding virtual UAV 1181, which stores the data, creates a transaction, signs the transaction, and broadcasts the signed transaction to the Blockchain network 101.

The fact of signing the transaction guarantees message authenticity (as any node has access to the sender's public key, the contents of the message will not be a secret, but the fact that it was encrypted using the sender's private key proves that the message could not have been sent by anyone else, thereby proving its authorship) and guarantees integrity (Since the public key cannot be used to decrypt messages, there is no risk if it falls into the wrong hands. In addition, it prevents third-party from decrypting such information even if they share the same communication channel). On the other hand, digital signature cryptography can provide non-repudiation, entity authentication and data origin authentication between nodes.

Once the broadcasted transaction is received, it must be verified by nodes on the Blockchain. A node needs to verify the sender (in S1215, S1227, S1233, S1241) by using the sender's public key to check if the data has been tampered or not, in S1217, S1229, S1235, S1243, check if the transaction is legal (transaction format, not malicious, double spends etc). The transaction is considered valid and, in S1219, S1231, S1237, S1245, can packed into a time-stamped block by special nodes called miners.

3) Block construction S805: Regarding FIG. 10B, to successfully add a new block in the Blockchain, the miners may need to verify (mine) a block by, in S1253, S1259, S1265, performing a consensus algorithm, for example solving a computationally difficult Proof of Work (PoW) puzzle. In PoW, each node of the network calculates a hash value of the block header. The block header contains a nonce and miners would change the nonce frequently to get different hash values. The consensus requires that the calculated value must be equal to or smaller than a certain given value. When a miner reaches the target value, in S1255, S1261, S1267, it would broadcast back the block and the solution into the Blockchain network. The mining process (PoW) is the main mechanism that enables the Blockchain to be trustless and secure. In the one embodiment, the PoW is performed in a PoW engine 1155 for the respective UAV 1181.

Then, in S1269, S1275, S1281, the Blockchain nodes receive the distributed block, check for its validity (S1271, S1277, S1283), verify if the solution is correct (if that solution corresponds with the problem of the senders' block). If it is valid, they stop trying to solve the PoW, in S1273, S1279, S1285, confirm the solution and, in S1287, agree that the block can be added to the Blockchain. In S1291, the new block is chained together with previous transactions blocks, making it part of a tamper-resistant ledger.

At that moment, the information contained in the block can no longer be deleted or modified, and it is available to everyone on the network. In S1293, S1295, S1299, S1303, a copy of the Blockchain, is stored, in S1297, S1301, S1305, by every node to ensure that they all share the same public database. In the one embodiment, the Blockchain is stored in a memory in the virtual UAV 1181. With these properties, the Blockchain becomes a permanent record that Users 107, UAVs 105 and GCS 103 can use to verify an event, track performed actions in an auditable and secure way without the need for a centralized authority.

Numerous modifications and variations of the present invention are possible in light of the above teachings. It is therefore to be understood that within the scope of the appended claims, the invention may be practiced otherwise than as specifically described herein.

The invention claimed is:

1. A secure system for control of at least one unmanned aerial vehicle (UAV), comprising:
   a cloud service; and
   a ground control station, wherein
   the cloud service includes a cloud-based management service having the at least one UAV client device, the cloud-based management service comprising processing circuitry configured to
      control communications between the cloud service, the ground control station and the at least one UAV; and control and monitor the at least one UAV by way of a corresponding said at least one UAV client device that
  receives messages from the at least one UAV,
  sends commands to the at least one UAV,
  verifies the sender of each of the received messages,
  creates a new block for each received message and sent commands as a new transaction, including performs a consensus algorithm for the new block,
  determines a consensus to validate the new block, and
  updates a blockchain with the validated new block, and
the processing circuitry receives sensor data from the at least one UAV to identify an event that requires immediate action and creates a transaction for the received sensor data.

2. The system of claim 1, wherein the processing circuitry is configured to control the UAV by sending commands via Web Services through the corresponding UAV client device.

3. The system of claim 1, wherein the UAV client device maintains a status of the at least one UAV, and
  wherein the status of the at least one UAV is updated in the UAV client device whenever a message is received from the at least one UAV.

4. The system of claim 1, wherein the UAV client device includes an interface to access and modify parameters of the at least one UAV.

5. The system of claim 1, wherein the processing circuitry further transmits the updated blockchain to the UAV.

6. The system of claim 1, wherein the processing circuitry further stores the updated blockchain in cloud storage for the UAV client device.

7. The system of claim 1, wherein the cloud-based management service includes a shared blockchain proof of work engine that performs the consensus algorithm for each UAV client to create the new block.

8. The system of claim 1, wherein each UAV client device includes a blockchain proof of work engine to perform the consensus algorithm for the new block.

9. The system of claim 1, wherein the UAV includes a blockchain proof of work engine to perform the consensus algorithm for the new block.

10. A method of secure control of at least one unmanned aerial vehicle (UAV), comprising:
  controlling the at least one UAV by way of a corresponding UAV client device in a cloud service, including
    receiving messages from the at least one UAV;
    sending commands to the at least one UAV;
    verifying a sender of each of the received messages;
    creating a new block for each received message and sent commands as new transactions, including performing a consensus algorithm for the new block;
    determining a consensus to validate the new block;
    updating a blockchain with the validated new block, and
    receiving sensor data from the at least one UAV to identify an event that requires immediate action and the corresponding UAV client device creates a transaction for the received sensor data.

11. The method of claim 10, wherein the controlling the at least one UAV is by way of commands sent via Web Services through the corresponding UAV client device.

12. The method of claim 10, further comprising
  maintaining in the UAV client device the status of the at least one UAV; and
  updating the status of the at least one UAV in the UAV client device whenever a message is received from the at least one UAV.

13. The method of claim 10, further comprising modifying parameters of the at least one UAV using an interface provided in the UAV client device.

14. The method of claim 10, further comprising transmitting the updated blockchain to the UAV.

15. The method of claim. 10, further comprising storing the updated blockchain in cloud storage for the UAV client device.

16. The method of claim 10, wherein the determining a consensus includes performing, by a shared blockchain proof of work engine of the cloud service, a consensus algorithm for each UAV client to create the new block.

17. The method of claim 10, wherein the determining a consensus includes performing, by a blockchain proof of work engine of each UAV client device, a consensus algorithm for the new block.

18. The method of claim 10, wherein the determining a consensus includes performing, by a blockchain proof of work engine of the UAV, a consensus algorithm for the new block.

* * * * *